(12) United States Patent
Chang et al.

(10) Patent No.: US 10,805,992 B2
(45) Date of Patent: Oct. 13, 2020

(54) COOKING MACHINE

(71) Applicant: BOTTLE TOP MACHINERY CO., LTD., Nantou County (TW)

(72) Inventors: Hong-I Chang, Nantou County (TW); Kuang-Tse Chin, Nantou County (TW); Ya-Chun Yu, Nantou County (TW); Jung-Kuei Hsieh, Nantou County (TW); Ming-Hsien Chou, Nantou County (TW)

(73) Assignee: Bottle Top Machinery Co., Ltd., Nantou, Nantou County (TW)

( * ) Notice: Subject to any disclaimer, the term of this patent is extended or adjusted under 35 U.S.C. 154(b) by 291 days.

(21) Appl. No.: 15/961,065

(22) Filed: Apr. 24, 2018

(65) Prior Publication Data

US 2019/0327797 A1   Oct. 24, 2019

(51) Int. Cl.
  *H05B 6/68* (2006.01)
  *A47J 44/00* (2006.01)
  *H05B 6/64* (2006.01)
  *H05B 6/80* (2006.01)
(52) U.S. Cl.
  CPC ............. *H05B 6/687* (2013.01); *A47J 44/00* (2013.01); *H05B 6/6411* (2013.01); *H05B 6/80* (2013.01)

(58) Field of Classification Search
  CPC ........ H05B 6/687; H05B 6/6411; H05B 6/80; A47J 44/00
  See application file for complete search history.

(56) References Cited

U.S. PATENT DOCUMENTS

| 3,714,888 A | * | 2/1973 | Tanguy | ................. A47J 37/044 99/355 |
| 5,177,333 A | | 1/1993 | Ogasawara | |
| 2018/0279426 A1 | * | 9/2018 | Chang | ..................... H05B 6/80 |

* cited by examiner

*Primary Examiner* — John C Hong
(74) *Attorney, Agent, or Firm* — Muncy, Geissler, Olds & Lowe, P.C.

(57) ABSTRACT

A cooking machine includes a microwave heating body, a transferring member for the cooking carrier, a transferring member for dish delivering and a cooking carrier for holding a object. The microwave heating body is moved up and down relative to the cooking carrier, and is correspondingly combined with the cooking carrier to form a heating cavity. The cooking carrier is pivotally arranged on the transferring member for the cooking carrier, and is movable to an initial position and a heating position. A cleaning assembly and a dish delivering member are arranged on the transferring member for dish delivering, and are movable to a position below the cooking carrier by turns. Thereby, the cooking carrier with the object can be cooked when moved to the heating position, and then moved to the initial position and turned to allow the cooked object to fall on the dish delivering member.

16 Claims, 9 Drawing Sheets

COOKING MACHINE

FIELD OF THE INVENTION

The present application relates to a cooking machine for heating objects, and particularly to a cooking machine which is capable of heating objects in real time.

BACKGROUND OF THE INVENTION

Heating is one of the basic industrial food processes. Methods of heating include contact heating (heating sources include fire, electric heating tubes, and ceramic heaters), microwave heating, electromagnetic induction heating and more. Contact heating is a conventional heating method. It requires a longer period of heating time since the temperature of a heat-receiving object rises from its exterior and the heat is gradually transmitted to its interior. The microwave is a kind of electromagnetic wave. Microwaves with specific frequencies enable the molecules of the heat-receiving object (for example, water) to resonate, so that the heating begins from the internal of the object rapidly. When the microwaves start heating the object, however, its intensity distribution thereof will vary according to factors such as the interactions between the microwave power generator, resonant cavity, the heat-receiving object and so on, thereby leading to uneven heating in certain parts.

Therefore, the U.S. Pat. No. 5,177,333 discloses a technology combining two heating methods, microwave and electromagnetic induction heating, to solve the problem of the non-uniform heating on the local positions. However, the operation method and the structure are the same as the conventional microwave oven, which requires manual operation for placing food into a specific container, turning on the microwave oven, taking out the heated food, cleaning the container and so on. Therefore, it is unable to be used for the industrial application which requires rapid and mass production. Thus, it is necessary to further improve the technology.

SUMMARY OF THE INVENTION

The purpose of the present application is to provide a cooking machine which is capable of cooking food in real time and is suitable for commercial use.

The present application provides a cooking machine which includes a microwave heating body, a first cooking carrier, a transferring member for the cooking carrier, a first cleaning assembly, a first dish delivering member and a first transferring member for dish delivering. The microwave heating body is moved up and down relative to the first cooking carrier, and is correspondingly combined with the cooking carrier to form a heating cavity. The first cooking carrier is used for holding a first object to be heated. The transferring member for the cooking carrier comprises a displacement stroke, and the first cooking carrier is pivotally arranged on the transferring member for the cooking carrier in a turnable manner, and is movable to an initial position and a heating position through the transferring member for the cooking carrier. In addition, at the heating position, the microwave heating body and the first cooking carrier are combined to form the heating cavity.

The first cleaning assembly provides cleaning liquid for flushing the first cooking carrier. The first dish delivering member is used for carrying the first object after being cooked. The first transferring member for dish delivering comprises a delivering stroke. The first cleaning assembly and the first dish delivering member are arranged on the first transferring member for dish delivering, and are moved to a position below the cooking carrier by turns through the first transferring member for dish delivering when the first cooking carrier is located at the initial position.

According to the above-mentioned mechanism, when the first cooking carrier is located at the initial position, the first object is put into the first cooking carrier, and then the first cooking carrier is moved by the transferring member for the cooking carrier to the heating position. At the moment, the microwave heating body is moved down towards the first cooking carrier and covers the first cooking carrier to combine with the first cooking carrier to form the heating cavity. The first object in the heating cavity then receives the microwave energy from the microwave heating body above and the heating power from the first cooking carrier below simultaneously. At the end of cooking, the cooking carrier is moved to the initial position, and the first dish delivering member is moved to the position below the first cooking carrier through the first transferring member for dish delivering. At the moment, the first cooking carrier may be turned over to allow the cooked first object to fall off onto the first dish delivering member, and then the first cleaning assembly is moved to the position below the first cooking carrier in turn through the first transferring member for dish delivering to flush the first cooking carrier by using the cleaning liquid. The first cooking carrier may be turned over again after being cleaned to the initial state, and a new object may be put into the first cooking carrier again.

Accordingly, the cooking machine of the present application may automatically complete the entire processing of cooking and cleaning, so that the labor cost can be reduced and the cooking machine is suitable for commercial mass production.

DETAILED DESCRIPTION OF THE PREFERRED EMBODIMENTS

Detailed descriptions and technical contents of the present application are described below in conjunction with the drawings.

Figure 1A:
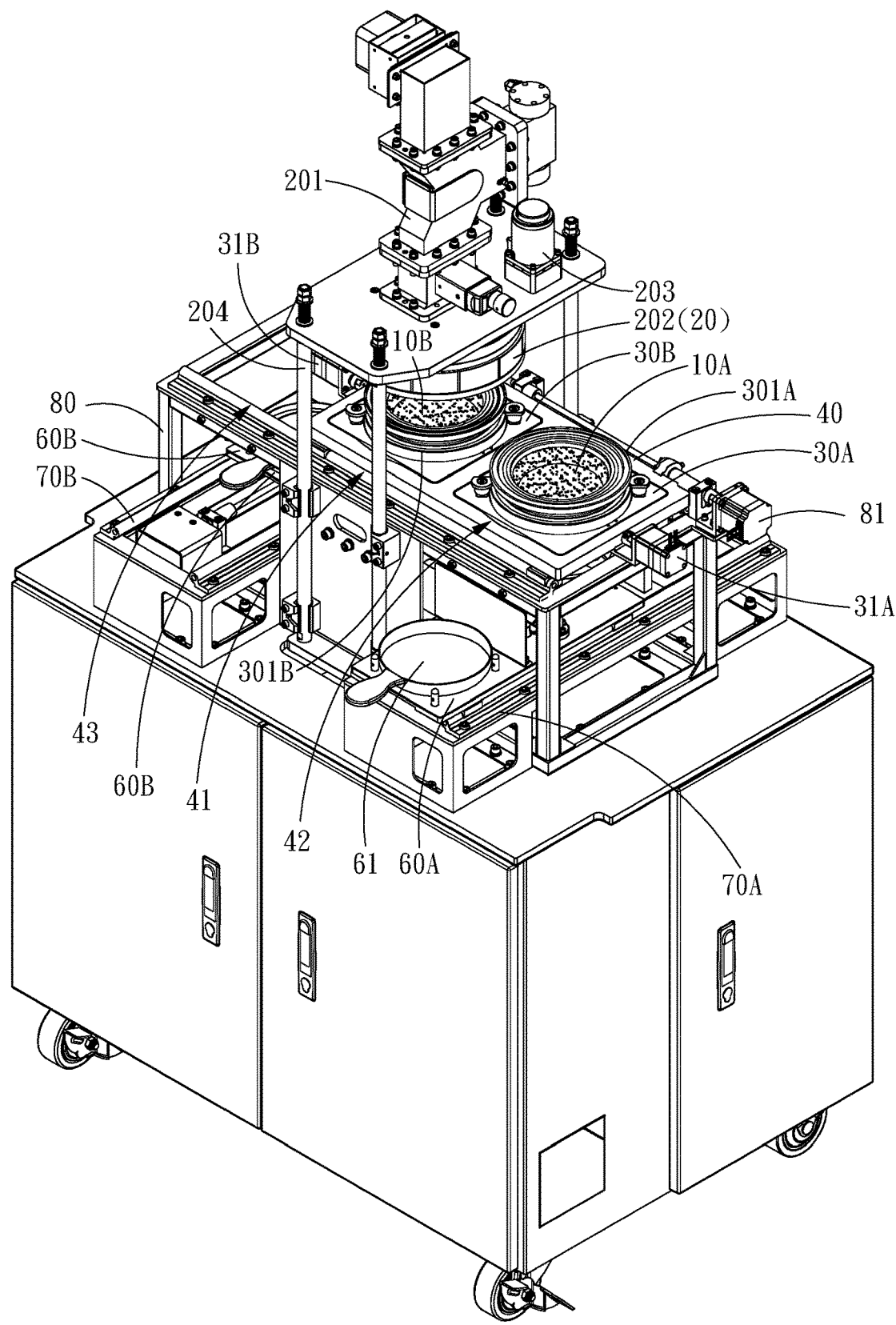
FIG. 1A is a schematic diagram of a structure of a preferred embodiment of the present application.
Figure 1B:
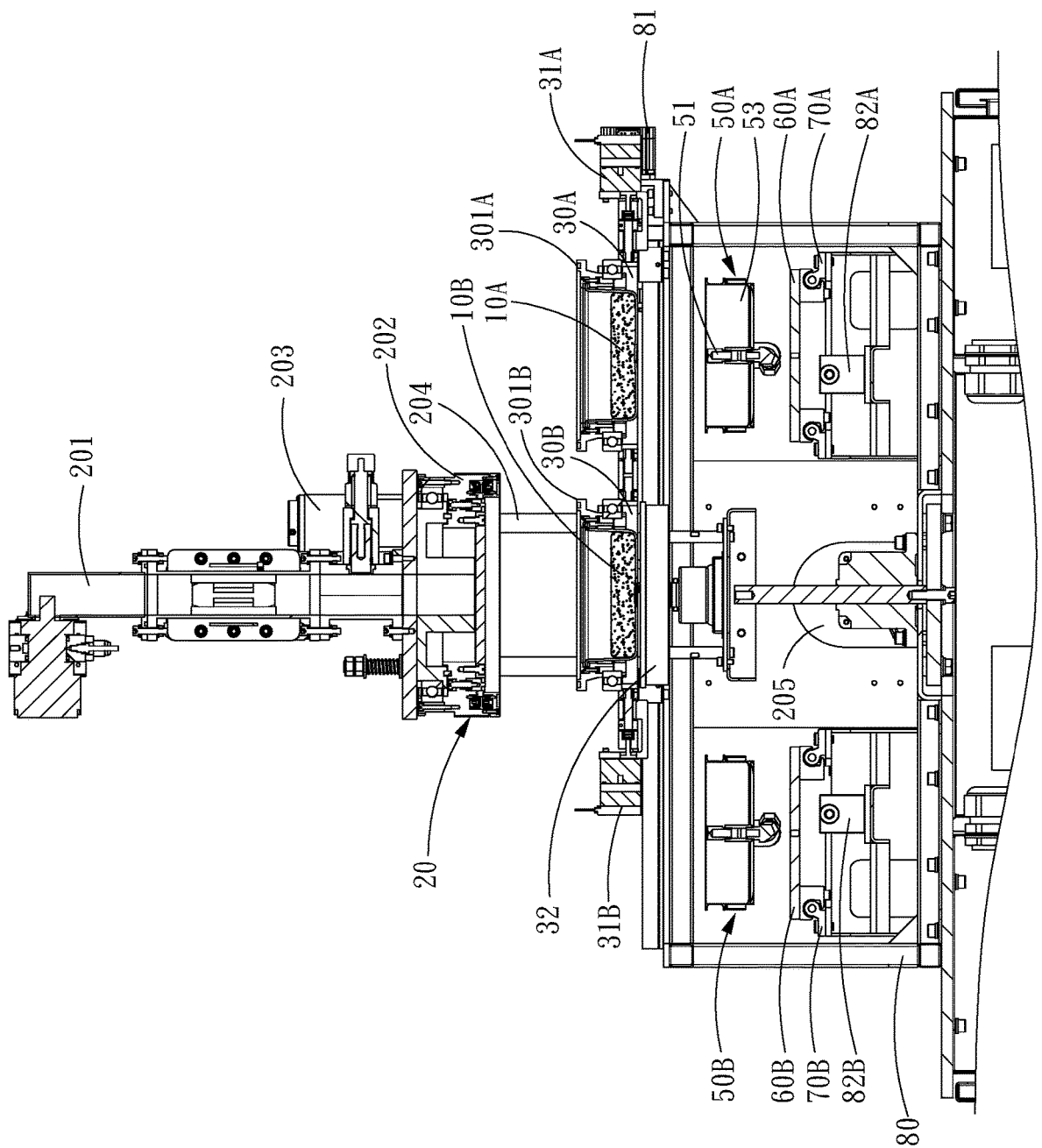
FIG. 1B is a cross-section diagram of a structure of a preferred embodiment of the present application.
Figure 3A:
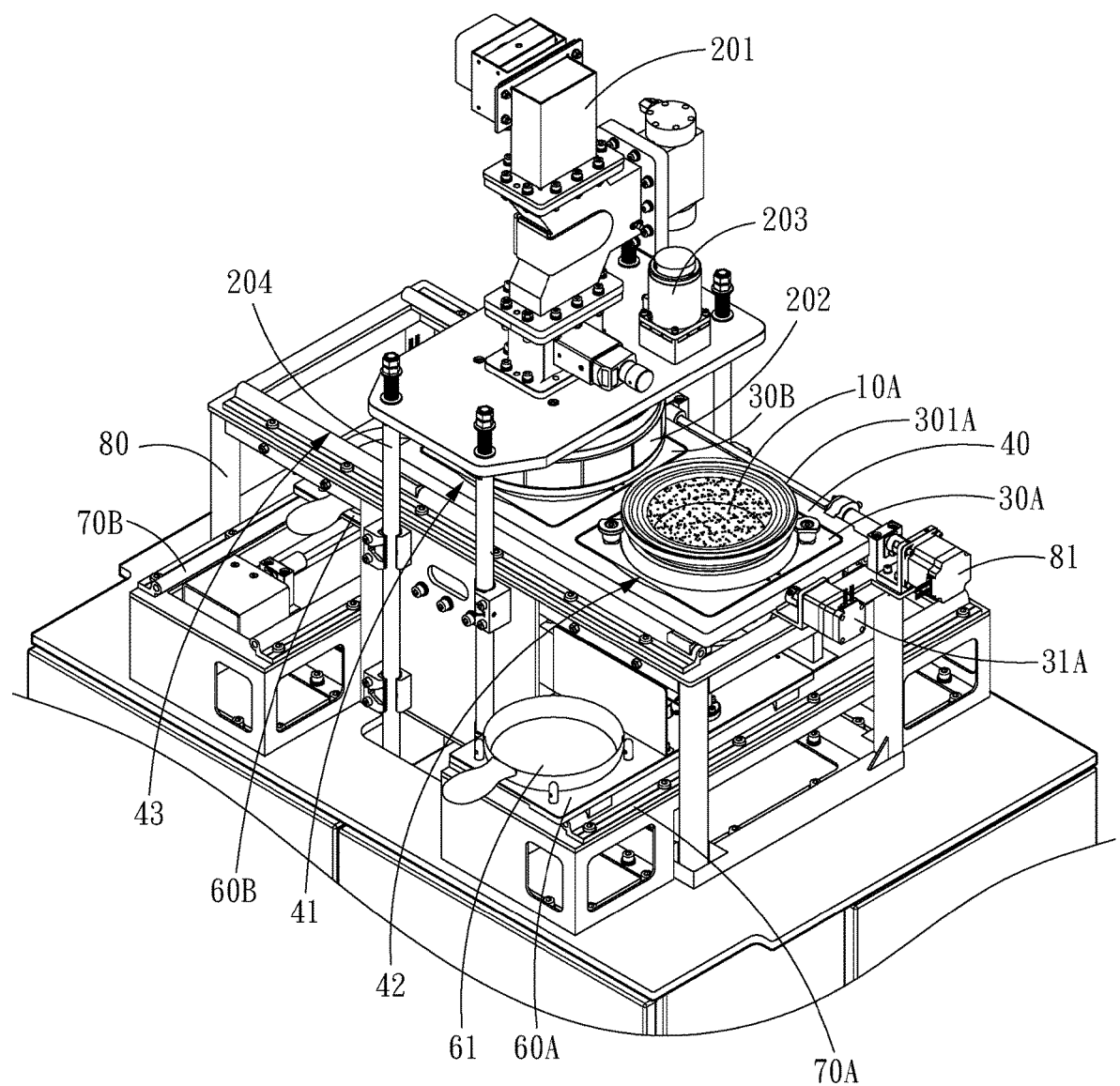
FIG. 3A is a schematic diagram of heating of a preferred embodiment of the present application.
Figure 3B:
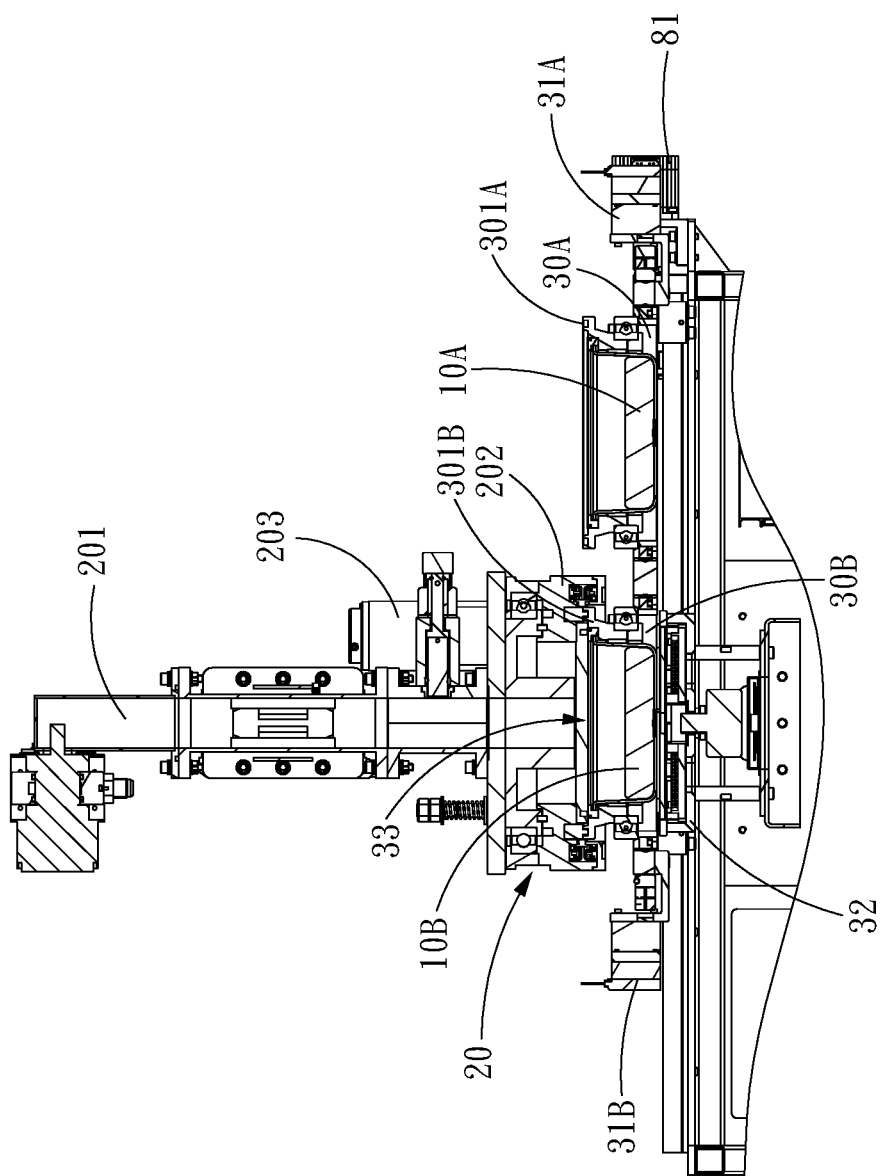
FIG. 3B is a cross-section diagram of a structure in FIG. 3A of the present application.

Referring to FIG. 1A and FIG. 1B, the present invention provides a cooking machine for cooking a first object 10A and a second object 10B. The cooking machine includes a microwave heating body 20, a first cooking carrier 30A, a second cooking carrier 30B, a transferring member for the cooking carrier 40, a first cleaning assembly 50A, a second cleaning assembly 50B, a first dish delivering member 60A, a second dish delivering member 60B, a first transferring member for dish delivering 70A and a second transferring member 70B. The microwave heating body 20 is moved up and down relative to the first cooking carrier 30A and the second cooking carrier 30B, and is correspondingly combined with the first cooking carrier 30A and the second cooking carrier 30B respectively to form a heating cavity 33 (as shown in FIG. 3B). The first cooking carrier 30A is used for holding the first object 10A (for example, uncooked food). The second cooking carrier 30B is used for holding the second object 10B (for example, uncooked food). The transferring member for the cooking carrier 40 comprises a displacement stroke, and the first cooking carrier 30A and the second cooking carrier 30B are respectively pivotally arranged on the transferring member for the cooking carrier 40 in a turnable manner. The first cooking carrier 30A is driven to turn over by a first turning motor 31A arranged on the transferring member for the cooking carrier 40. The second cooking carrier 30B is driven to turn over by a second turning motor 31B arranged on the transferring member for the cooking carrier 40

The first cooking carrier 30A and the second cooking carrier 30B are alternately moved between an identical heating position 41 and symmetric first initial positions 42 and 43 through the transferring member for the cooking carrier 40, and the first cooking carrier 30A and the second cooking carrier 30B are moved to the heating position 41 by turns through the transferring member for the cooking carrier 40. When the second cooking carrier 30B is moved to the heating position 41 (as shown in FIG. 3A), the microwave heating body 20 is combined with the second cooking carrier 30B to form the heating cavity 33 (as shown in FIG. 3B). Referring to FIG. 1A again, the first cooking carrier 30A on the right side is located at the initial position 42, and the second cooking carrier 30B on the left side is located at the heating position 41.

Referring to FIG. 1B, the first cleaning assembly 50A and the second cleaning assembly 50B are symmetrically arranged. The first dish delivering member 60A and the second dish delivering member 60B are symmetrically arranged. The first transferring member for dish delivering 70A and the second transferring member for dish delivering 70B are symmetrically arranged. The first dish delivering member 60A and the second dish delivering member 60B are used for carrying the first cooked object 10A and the second cooked object 10B. The first transferring member for dish delivering 70A and the second transferring member for dish delivering 70B respectively comprise a first delivering stroke and a second delivering stroke. The first cleaning assembly 50A and the first dish delivering member 60A are arranged on the corresponding first transferring member 70A. The second cleaning assembly 50B and the second dish delivering member 60B are arranged on the corresponding second transferring member 70B. In addition, when the first cooking carrier 30A is moved to the initial positions 42, the first cleaning assembly 50A and the first dish delivering member 60A are moved to the position below the first cooking carrier 30A by turns through the first transferring member for dish delivering 70A. Similarly, when the second cooking carrier 30B is moved to the initial positions 43, the second cleaning assembly 50B and the second dish delivering member 60B are moved to the position below the second cooking carrier 30B by turns through the second transferring member for dish delivering 70B. Thus, the cooking efficiency is improved.

Further, referring to FIG. 1A and FIG. 3B, the microwave heating body 20 is connected to a microwave generation device 201. The microwave generation device 201 generates microwaves and delivers the microwaves into the heating cavity 33. In addition, the microwave generation device 201 is equipped with a microwave intensity adjusting function which allows the operator to adjust the intensity of the microwave heating power and control the length of the microwave heating time according to the type of the object 10. A conductive heating device 32 is provided below the heating position 41, and the conductive heating device 32 may be an electromagnetic heating device, a gas heating device, an infrared lamp, an electric heating wire, or any other heating source that can transmit heat to the first cooking carrier 30A and the second cooking carrier 30B. Among the options of heating sources, the preferable one is the electromagnetic heating device which heats the first cooking carrier 30A and the second cooking carrier 30B through high-frequency electromagnetic waves, and then the heat is transmitted from the first cooking carrier 30A into the heating cavity 33. The heating power of the conductive heating device 32 also may be adjusted by a conductive heating power controller (not shown in the figures) according to the types of the first object 10A and the second object 10B.

Furthermore, as shown in FIG. 1A and FIG. 1B, the cooking machine may further include a rack 80. The microwave heating body 20, the transferring member for the cooking carrier 40, the first transferring member for dish delivering 70A and the second transferring member dish delivering 70B are fixed on the rack 80. The transferring member for the cooking carrier 40 is driven by a displacement motor for the cooking carrier 81 arranged on the rack 80 to have the displacement stroke. The first transferring member for dish delivering 70A is driven by a first displacement motor 82A arranged on the rack 80 to have the first delivering stroke. Similarly, the second transferring member for dish delivering 70B is driven by a second displacement motor 82B arranged on the rack 80 to have the second delivering stroke.

In addition, referring to FIG. 3B, the first cooking carrier 30A may be provided with a first pot body container 301A with a rotational degree of freedom, and the second cooking carrier 30B may be provided with a second pot body container 301B with a rotational degree of freedom. The microwave heating body 20 is provided with a rotating pot cover 202. The rotating pot cover 202 presses the first pot body container 301A tightly when the microwave heating body 20 and the first cooking carrier 30A are combined. Further, the rotating pot cover 202 is driven by a rotating motor 203 to rotate, and drives the first pot body container 301A to rotate through a friction force. Similarly, the rotating pot cover 202 presses the second pot body container 301B tightly when the microwave heating body 20 and the second cooking carrier 30B are combined. Further, the rotating pot cover 202 is driven by a rotating motor 203 to rotate, and drives the second pot body container 301B to rotate through a friction force. Besides, the contact surfaces of the first pot body container 301A and the rotating pot cover 202 may be made of high-friction elastic silicon materials so as to ensure that the first pot body container 301A is able to be rotated. Also, the contact surfaces of the second pot body container 301B and the rotating pot cover 202 may be made of high-friction elastic silicon materials. Thus, the uneven heating problem caused by the difficulty of heating the corners of the traditional microwave oven can be solved. Moreover, the surfaces of the first pot body container 301A, the second pot body container 301B and the rotating pot cover 202 may be coated with Teflon to improve the convenience of cleaning. In addition, the first pot body container 301A and the second pot body container 301B are covered tightly by the rotating pot cover 202, and the connecting interface between them are provided with microwave leakage prevention devices or structures so as to avoid the leakage of the microwave.

Further, referring to FIG. 1B, the microwave heating body 20 is slidably arranged on the rack 80 through a plurality of sliding rods 204, and the microwave heating body 20 is driven to move up and down relative to the first cooking carrier 30A and the second cooking carrier 30B by a lifting motor 205 arranged on the rack 80. That is, the relative positions of the microwave heating body 20 and the first cooking carrier 30A and the second cooking carrier 30B are controlled by the lifting motor 205 so as to close or open the first pot body container 301A and the second pot body container 301B.

Figure 2A:
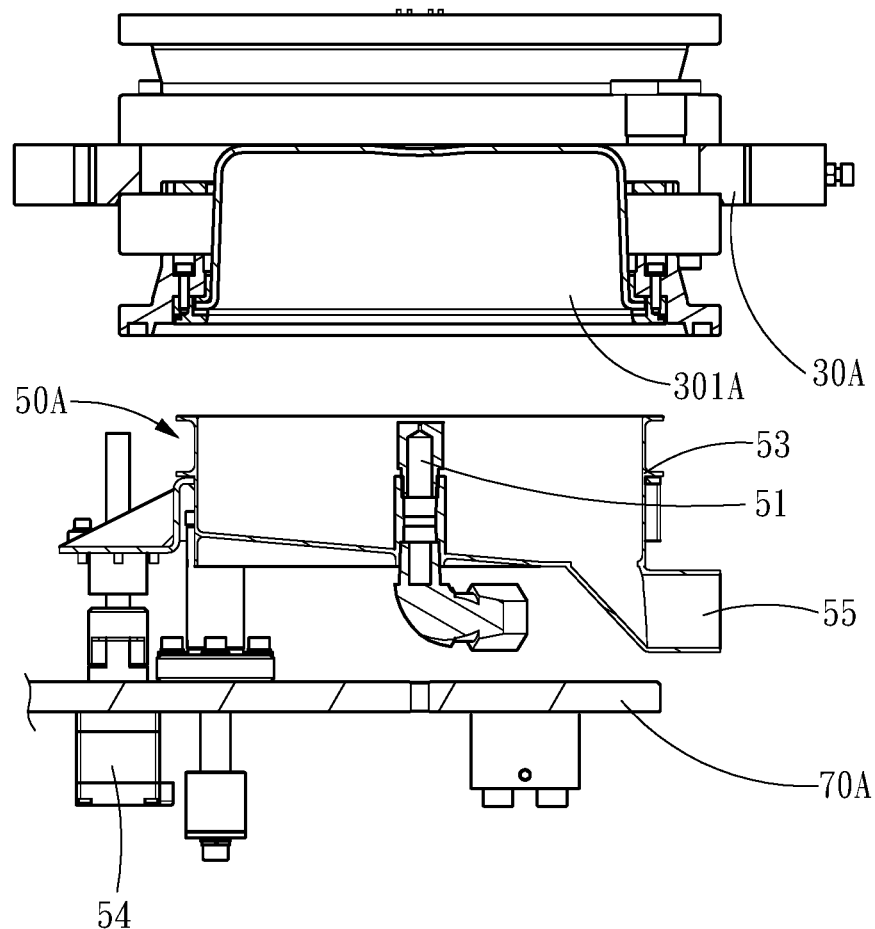
FIG. 2A is a schematic diagram of a first cleaning assembly of a preferred embodiment of the present application.
Figure 2B:
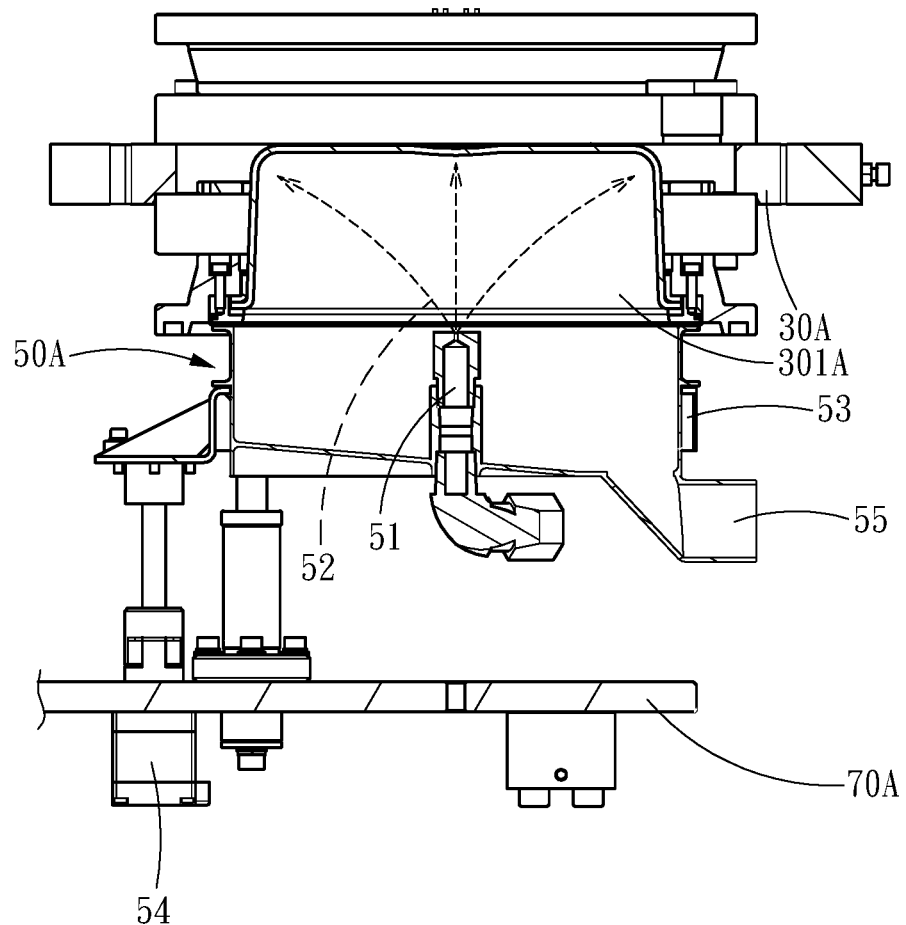
FIG. 2B is a schematic diagram of flushing of a first cleaning assembly of a preferred embodiment of the present application.

Further, referring to FIG. 1A, FIG. 2A and FIG. 2B, the structures of the first cleaning assembly 50A and the second cleaning assembly 50B are the same. Take the first cleaning assembly 50A as an example, the first cleaning assembly 50A is provided with a nozzle 51 which is capable of spraying cleaning liquid 52, a cover body 53 on which the nozzle 51 is arranged and may be risen up to cover the first pot body container 301A, and a moving motor 54 for driving the cover body 53 to move up and down. A drainage channel 55 is arranged in the cover body 53. In detail, the moving motor 54 drives the cover body 53 to rise up to cover the first pot body container 301A of the first cooking carrier 30A. Then, the nozzle 51 sprays the cleaning liquid 52 to clean the first pot body container 301A. Furthermore, referring to FIG. 1A, the structures of the first dish delivering member 60A and the second dish delivering member 60 are the same, and each of them may be a platform for a holding plate 61 to be placed on.

Referring to FIG. 3A and FIG. 3B which show the structure diagrams of the present application during heating. When the first cooking carrier 30A is located at the initial position 42, the first object 10A (for example, food) to be heated is put into the first cooking carrier 30A, and then the first cooking carrier 30A is moved to the heating position 41 by the transferring member for the cooking carrier 40. Similarly, When the second cooking carrier 30B is located at the initial position 43, the second object 10B (for example, food) to be heated is put into the second cooking carrier 30B, and then the second cooking carrier 30B is moved to the heating position 41 by the transferring assembly member for the cooking carrier 40. Furthermore, when the first cooking carrier 30A is located at the heating position 41, the microwave heating body 20 is moved toward the first cooking carrier 30A so as to cover the first pot body container 301A, and is combined with the first cooking carrier 30A to form the heating cavity 33 (as shown in FIG. 3B). At this moment, since the first object 10 is located in the heating cavity 33 (as shown in FIG. 3B), the first object 10 can receive the microwave energy from the microwave heating body 20 above and the heating power below the first cooking carrier 30A simultaneously. Therefore, the cooking machine provides the microwave energy from the top and the heating power from the bottom to achieve the dual effect. Similarity, when the second cooking carrier 30B is located at the heating position 41, the second object 10B can also receive the microwave energy from the microwave heating body 20 above and the heating power below the second cooking carrier 30B simultaneously. As shown in FIG. 3A, the first object 10A in the first cooking carrier 30A on the right side has been cooked, while the second object 10B in the second cooking carrier 30B on the left side is cooking.

Figure 4:
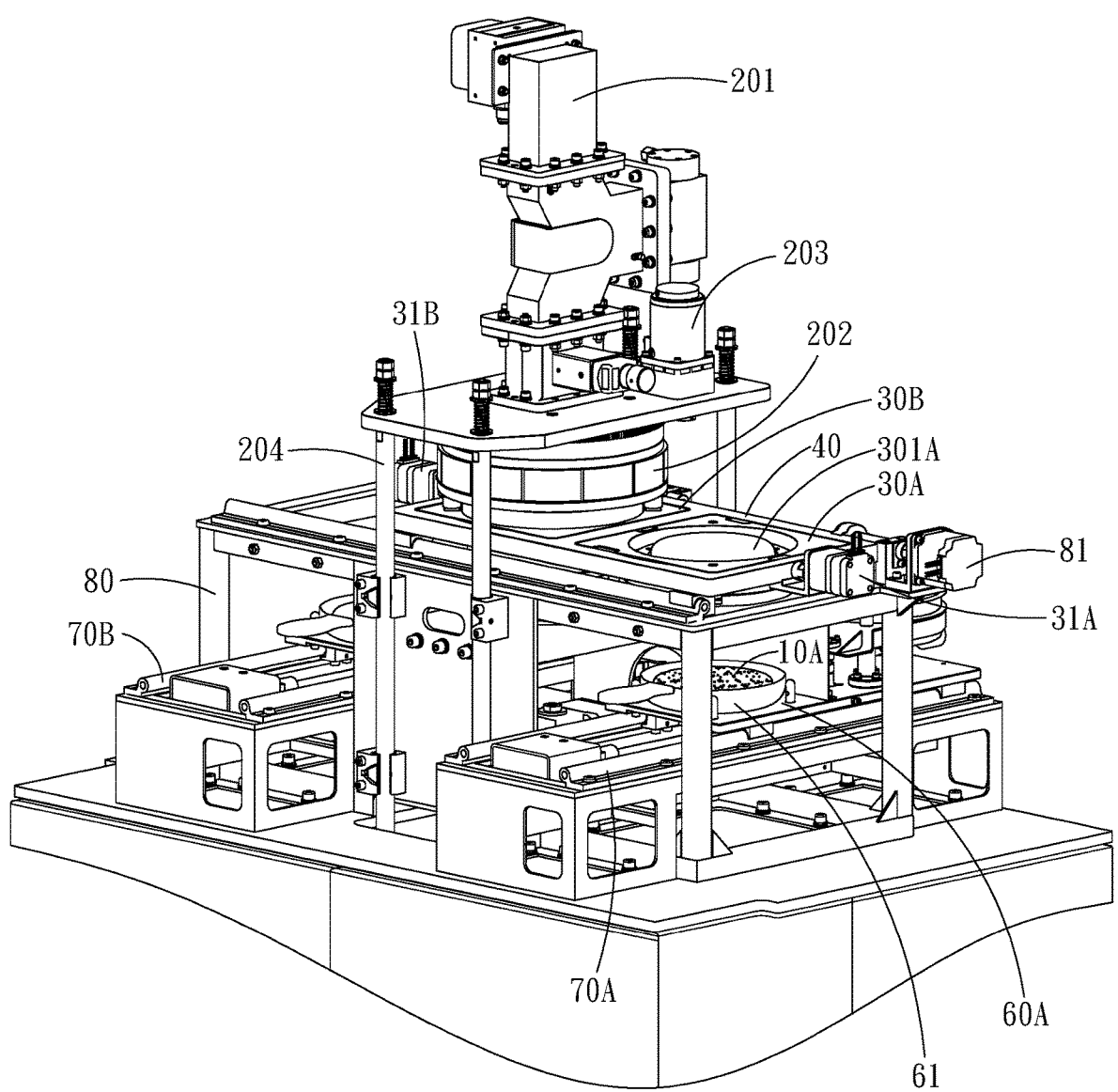
FIGS. 4 to 6 are operation diagrams of a structure of a preferred embodiment of the present application.
Figure 5:
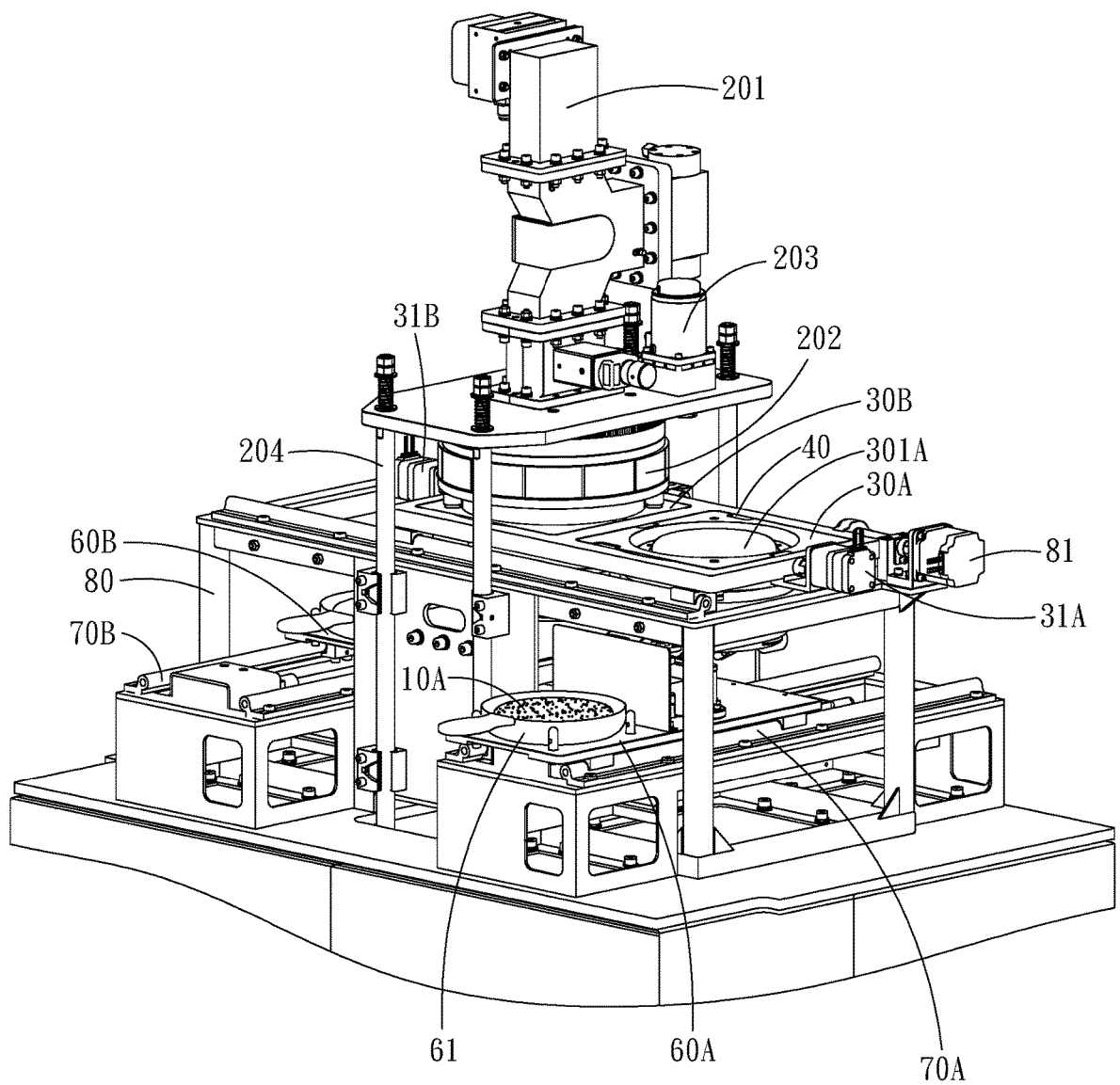
Figure 6:
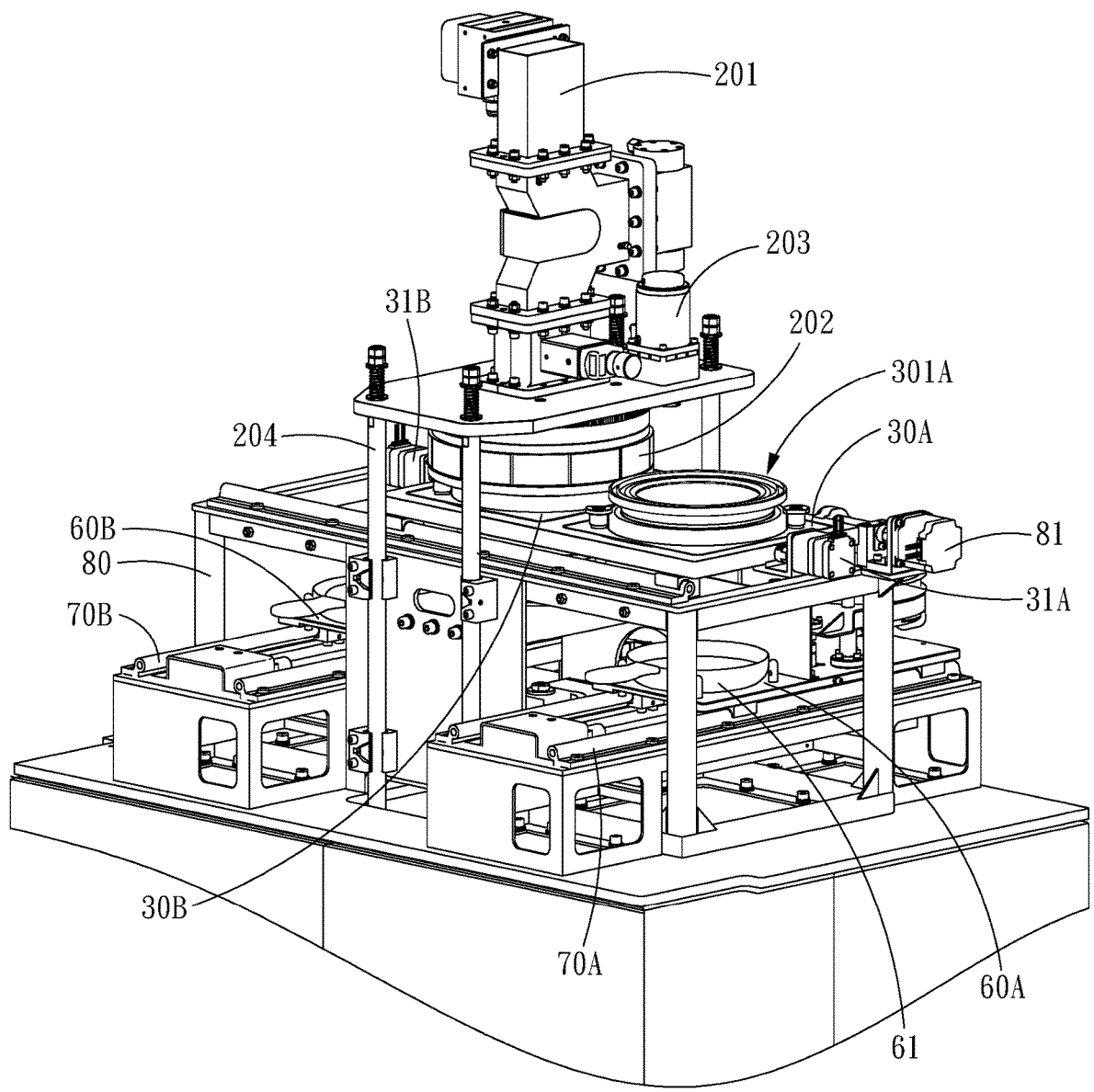

Referring to FIG. 4, FIG. 5 and FIG. 6 together, the first cooking carrier 30A on the right side is located at the initial position 42 when the first object 10A in the first cooking carrier 30A on the right side has been cooked (as shown in FIG. 3A). Then, the first dish delivering member 60A on the right side is moved to the position below the first cooking carrier 30A through the first transferring member for dish delivering 70A. At the moment, the first cooking carrier 30A is driven to turn over against the transferring member for the cooking carrier 40 to enable the first object 10A to fall off onto the holding plate 61 of the first dish delivering member 60A (as shown in FIG. 4). Next, the first cleaning assembly 50A on the right side is moved to the position below the first cooking carrier 30A through the first transferring member for dish delivering 70A. In the meantime, the cover body 53 is driven by the moving motor 54 to rise up to cover the first pot body container 301A of the first cooking carrier 30A (as shown in FIG. 5 and FIG. 2B) so as to clean the first cooking carrier 30A by using the cleaning liquid 52. After the first cooking carrier 30A is cleaned, the first cooking carrier 30A is turned over again to return to the initial state (as shown in FIG. 6), and a new object 10 can be put into the first cooking carrier 30A again. At the moment, the first dish delivering member 60A is moved to the position below the first cooking carrier 30A again. Similarly, the second cooking carrier 30B on the left also performs the same operation as the first cooking carrier 30A.

As mentioned above, compared with the prior art, the present application has the advantages as follows:

1. The cooking machine may automatically complete the entire processing of cooking and cleaning so that the labor cost can be reduced, and the cooking machine is suitable for commercial mass production.

2. The time can be fully used due to the symmetrical arrangement of the first cleaning assembly and the second cleaning assembly, the first dish delivering member and the second dish delivering member, and the first transferring member for dish delivering and the second transferring member for dish delivering. The yield of the cooked food can also be increased due to the alternate combination of the first cooking carrier, the second cooking carrier and the microwave heating body. Therefore, the cooking machine is suitable for various application conditions and meets commercial demands.

3. Since the cooking machine provides two heating methods, microwave energy from the top and the heating power from the bottom, and the cooking machine is continuously rotated during the heating process, the food can be cooked quickly and evenly.

4. The cooking machine may achieve the effect of fire fry. Thus, the edible safety of food is guaranteed, and a crisp taste is maintained.

What is claimed is:

1. A cooking machine, comprising:
a first cooking carrier, configured to hold a first object to be heated;
a microwave heating body, moved up and down relative to the first cooking carrier, and correspondingly combined with the first cooking carrier to form a heating cavity;
a transferring member for the cooking carrier, comprising a displacement stroke, wherein the first cooking carrier is pivotally arranged on the transferring member for the cooking carrier in a turnable manner, and the first cooking carrier is movable between a first initial position and a heating position through the transferring member for the cooking carrier, and the microwave heating body and the first cooking carrier are combined to form the heating cavity when the first cooking carrier is moved to the heating position;

a first cleaning assembly, providing cleaning liquid for flushing the first cooking carrier;

a first dish delivering member, configured to carry the first object; and a first transferring member for dish delivering, comprising a first delivering stroke, wherein the first cleaning assembly and the first dish delivering member are arranged on the first transferring member for dish delivering, and the first cleaning assembly and the first dish delivering member are moved to a position below the first cooking carrier by turns through the first transferring member for dish delivering when the first cooking carrier is moved to the first initial position.

2. The cooking machine of claim 1, further comprising a second cooking carrier, a second cleaning assembly, a second dish delivering member and a second transferring member for dish delivering, wherein the first cooking carrier and the second cooking carrier are respectively pivotally arranged on the transferring member for the cooking carrier in a turnable manner, and the second cooking carrier is movable between the heating position and a second initial position symmetric with the first initial position of the first cooking carrier, and the first cooking carrier and the second cooking carrier are moved to the heating position by turns through the transferring member for the cooking carrier to combine with the microwave heating body respectively to form the heating cavity; and wherein the first cleaning assembly and the second cleaning assembly are symmetrically arranged, the first dish delivering member and the second dish delivering member are symmetrically arranged, and the first transferring member for dish delivering and the second transferring member for dish delivering are symmetrically arranged, and the second transferring member for dish delivering comprises a second delivering stroke.

3. The cooking machine of claim 2, wherein the first cooking carrier is driven to turn over by a first turning motor arranged on the transferring member for the cooking carrier, and the second cooking carrier is driven to turn over by a second turning motor arranged on the transferring member for the cooking carrier.

4. The cooking machine of claim 2, further comprising a rack, wherein the microwave heating body, the transferring member for the cooking carrier, the first transferring member for dish delivering and the second transferring member for dish delivering are fixed on the rack, and the transferring member for the cooking carrier is driven by a displacement motor for the cooking carrier arranged on the rack to perform the displacement stroke; the first transferring member for dish delivering is driven by a first displacement motor arranged on the rack to perform the first delivering stroke; the second transferring member for dish delivering is driven by a second displacement motor arranged on the rack to perform the second delivering stroke.

5. The cooking machine of claim 4, wherein the first cooking carrier is provided with a first pot body container with a rotational degree of freedom; the microwave heating body is provided with a rotating pot cover; the rotating pot cover which presses the first pot body container tightly when the microwave heating body and the first cooking carrier are correspondingly combined; the second cooking carrier is provided with a second pot body container with a rotational degree of freedom; the rotating pot cover which presses the second pot body container tightly when the microwave heating body and the second cooking carrier are correspondingly combined;

and wherein the rotating pot cover is driven by a rotating motor to rotate, and drives the first pot body container and the second pot body container to rotate through a friction force.

6. The cooking machine of claim 4, wherein the microwave heating body is slidably arranged on the rack through a plurality of sliding rods, and the microwave heating body is driven to move up and down relative to the first cooking carrier and the second cooking carrier by a lifting motor arranged on the rack.

7. The cooking machine of claim 2, wherein structures of the first cleaning assembly and the second cleaning assembly are the same; the first cleaning assembly is provided with a cover body risen up to cover the first cooking carrier, a nozzle arranged on the cover body for spraying the cleaning liquid, and a moving motor for driving the cover body to move up and down, wherein a drainage channel is arranged in the cover body.

8. The cooking machine of claim 2, wherein structures of the first dish delivering member and the second dish delivering member are the same; the first dish delivering member is a platform for a holding plate to be placed on.

9. The cooking machine of claim 1, wherein the microwave heating body is connected to a microwave generation device, and the microwave generation device generates microwaves and delivers the microwaves into the heating cavity.

10. The cooking machine of claim 1, further comprising a conductive heating device installed below the heating position; wherein the conductive heating device is selected from the group consisting of an electromagnetic heating device, a gas heating device, an infrared lamp and an electric heating wire.

11. The cooking machine of claim 1, wherein the first cooking carrier is driven to turn over by a turning motor arranged on the first transferring member.

12. The cooking machine of claim 1, further comprising a rack, wherein the microwave heating body, the transferring member for the cooking carrier, the first transferring member for dish delivering are fixed on the rack, and the transferring member for the cooking carrier is driven by a displacement motor for the cooking carrier arranged on the rack to perform the displacement stroke, and the first transferring member for dish delivering is driven by a first displacement motor arranged on the rack to perform the first delivering stroke.

13. The cooking machine of claim 12, wherein the first cooking carrier is provided with a first pot body container with a rotational degree of freedom; the microwave heating body is provided with a rotating pot cover which presses the first pot body container tightly when the microwave heating body and the first cooking carrier are correspondingly combined; and wherein the rotating pot cover is driven by a rotating motor to rotate, and drives the first pot body container to rotate through a friction force.

14. The cooking machine of claim 12, wherein the microwave heating body is slidably arranged on the rack through a plurality of sliding rods, and the microwave heating body is driven to move up and down relative to the first cooking carrier by a lifting motor arranged on the rack.

15. The cooking machine of claim 1, wherein the first cleaning assembly is provided with a cover body risen up to cover the first cooking carrier, a nozzle arranged on the cover body for spraying the cleaning liquid, and a moving motor for driving the cover body to move up and down, wherein a drainage channel is arranged in the cover body.

16. The cooking machine of claim 1, wherein the first dish delivering member is a platform for a holding plate to be placed on.

\* \* \* \* \*